United States Patent [19]

Zhong

[11] Patent Number: 5,534,925
[45] Date of Patent: Jul. 9, 1996

[54] IMAGE COMPRESSION BY OPTIMAL RECONSTRUCTION

[75] Inventor: Sifen Zhong, Los Angeles, Calif.

[73] Assignee: Cognitech Inc., Santa Monica, Calif.

[21] Appl. No.: 237,594

[22] Filed: May 2, 1994

[51] Int. Cl.$^6$ ..................................................... H04N 7/32
[52] U.S. Cl. ........................................ 348/384; 382/199
[58] Field of Search .................................. 348/384, 390,
  348/400, 403, 404, 405, 407, 699; 345/136,
  137, 138; 382/22, 42, 54; H04N 7/32

[56] References Cited

U.S. PATENT DOCUMENTS

| | | | |
|---|---|---|---|
| 4,851,825 | 7/1989 | Naiman .................................... | 345/138 |
| 4,887,156 | 12/1989 | Ohki ....................................... | 348/400 |
| 4,918,626 | 4/1990 | Watkins et al. ......................... | 345/136 |
| 5,113,255 | 5/1992 | Nagata et al. .......................... | 348/384 |
| 5,144,426 | 9/1992 | Tanaka et al. .......................... | 348/400 |
| 5,197,108 | 3/1993 | Watanabe ................................ | 345/137 |
| 5,251,028 | 10/1993 | Iu ............................................ | 348/400 |
| 5,333,012 | 7/1994 | Singhal et al. ......................... | 348/405 |
| 5,351,315 | 9/1994 | Ueda et al. ............................. | 345/136 |
| 5,379,122 | 1/1995 | Eschbach ................................ | 348/384 |

*Primary Examiner*—Tommy P. Chin
*Assistant Examiner*—Vu Le
*Attorney, Agent, or Firm*—Robert M. Wallace

[57] ABSTRACT

A method of producing a video image from a compressed version of a source video image which has been compressed by transforming to a transform domain and quantizing the source video image in accordance with quantization constraints, including back-transforming from the transform domain and dequantizing the compressed version to produce a decompressed video image, reducing total variation in the first decompressed video image to produce a reduced variation image, transforming the reduced variation image to produce a revised transform and conforming the revised transform with the quantization constraints of the compressed version so as to produce a constrained transform, and back-transforming the constrained transform so as to produce a replica of the source video image.

24 Claims, 8 Drawing Sheets

| F | 1 2 3 4 5 6 7 8 | 9 10 11 12 13 14 15 16 | 17 18 19 20 21 22 23 24 |
|---|---|---|---|
| $\bar{F}$ | 1 | 2 | 3 |

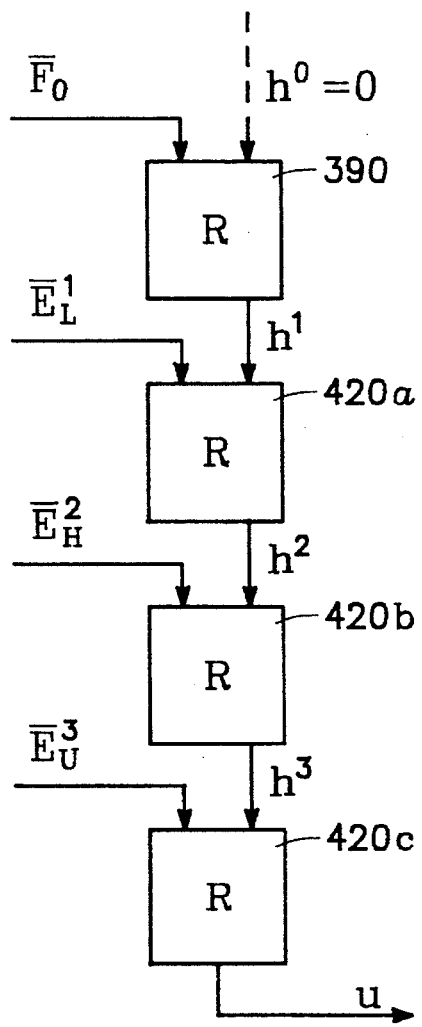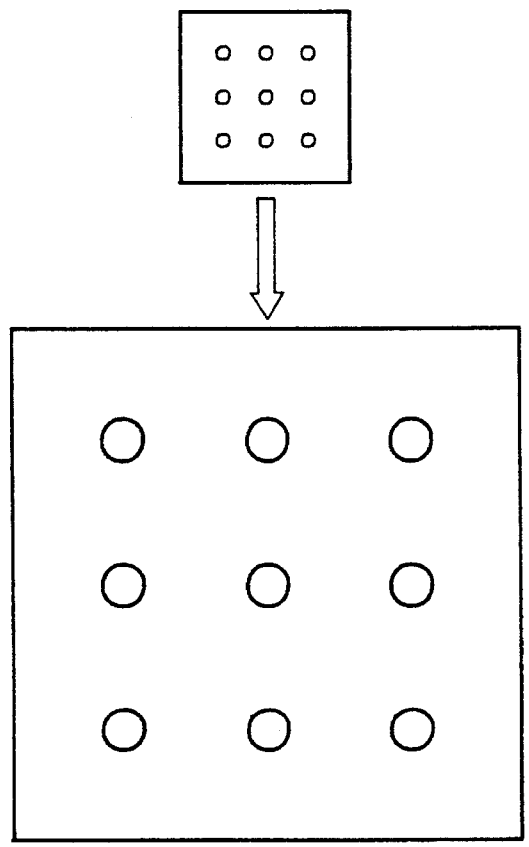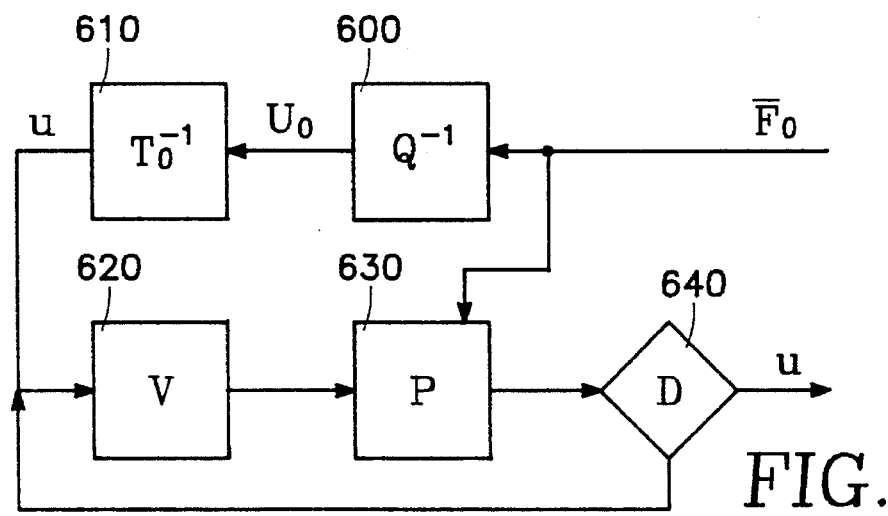
FIG. 12
FIG. 13
FIG. 14

IMAGE COMPRESSION BY OPTIMAL RECONSTRUCTION

BACKGROUND OF THE INVENTION

1. Technical Field

The invention is related to processes and apparatus for compressing and decompressing images.

2. Background Art

A fundamental goal of image compression is to reduce the amount of data necessary to represent an image while maintaining acceptable image fidelity. Examples of important applications include image transmission and image storage.

Image compression has long been an active research field, and various image compression methods have been developed. However, many of these methods are not practically useful, either because they cannot achieve high compression ratio with good image fidelity (as in the case of differential pulse code modulation or DPCM), or because they do not have tractable computational complexity (as in the case of "second generation" multiscale edge coding. In the prior art, the best image compression methods that have been used practically in an imaging system are transform coding, vector quantization (VQ), and a combination of thereof. These transform-quantization methods offer compression ratios of about 10:1 on a single frame gray-level image. When higher compression ratios are considered, a transform-quantization method may introduce unacceptable artifacts such as ringing, blurring, and blocking.

A general framework of a transform-quantization compression system consists of (1) a transform operator, (2) a quantizer, and (3) an entropy coder.

In the compression phase:

the transform operator transforms the source image to transform coefficients that can be coded more efficiently;

the quantizer maps the transform coefficients into a smaller set of symbols in order to reduce the space of the symbols to be encoded; and the entropy coder converts the symbols into a more compact bit stream as the compressed data.

In the decompression phase:

the entropy coder converts the bit stream back to the symbols;

the quantizer maps the symbols back to the transform coefficients;

the transform operator inverts the transform coefficients back to an image.

The purpose of the transform is to convert correlated image pixel values into relatively uncorrelated transform coefficients. Depending on how the transforms are computed and how the data are organized, the transforms are traditionally divided into two categories: subband transforms and block transforms, and the coding methods based on these transforms are called subband coding and block transform coding, respectively. A subband transform is computed by a multirate filter bank system. The output data are organized as a set of subimages. Each subimage corresponds to a frequency subband. A block transform is a transform applied to non-overlapping blocks of the image. Each block of pixels is transformed to a block of coefficients. Since it is trivial to convert the data in block organization to subimage organization, a block transform is mathematically equivalent to a subband transform. Therefore, a subband transform unifies all the transforms used for transform coding. The transforms that have been used for transform coding include discrete cosine transform (DCT), Wals-Hadamard transform (WHT), Haar transform, Karhunen-Loeve transform (KLT), discrete wavelet transform (DWT), and wave-packets transform.

A quantizer for the transform coefficients consists of a partition of the transform coefficient space into disjointed bins, each bin having a reproduction value. In the compression phase, the quantizer maps each transform coefficient to the index of the bin it belongs to. These indices, forming a reduced representation of the transform coefficients, are the symbols to be encoded. The quantization reduces the space of the symbols to be encoded but also reduces the accuracy of the image information. In the decompression phase, the quantizer maps each bin index to its reproduction value. The difference between a transform coefficient value and its quantization reproduction value is the quantization distortion.

It is believed that the quantization on grouped values produces better results than the quantization on individual values. The transform coefficients can be grouped into vectors by associated parameters such as position or frequency. A k-dimensional vector quantizer consists of a partition of k-dimensional vector space into disjointed bins, each bin having a k-dimensional reproduction vector. In the compression phase, the quantizer maps each vector of k transform coefficients into the index of the bin the vector belongs to; in the decompression phase, the quantizer maps each bin index to its reproduction vector. A motivation for transform-quantization coding is that the image information is typically concentrated on low frequencies, and the high frequency information is less important and thus can be reduced more severely. Accordingly, the low frequency coefficients are quantized with minimal bin size while the high frequency coefficients are quantized with larger bin sizes. In practice, most high frequency coefficients are mapped to the zero bin and discarded before the encoding. Most quantization distortions on high frequency coefficients do not damage the image fidelity.

A problem with transform-quantization coding is that the truncation of high frequency coefficients introduces artifacts. While most high frequency coefficients are insignificant, those associated with edges and lines are very important. Truncating those high frequency coefficients will blur the edges and lines as well as cause ringing effects (Gibbs phenomenon).

In addition, a more severe problem with block transform coding is artifacts known as blocking artifacts. Blocking artifacts are the discontinuities between adjacent blocks introduced by the block transform coding, particularly at a high compression ratio.

A method for deblocking, or reducing the blocking artifacts, is to impose a number of constraints on the reconstruction image. One such constraint is the bandlimited constraint, which is derived from the fact that the vertical and horizontal high frequency components contained in the reconstruction image are due to the blocking artifacts and are missing in the original image. By imposing the bandlimited constraint the reconstruction image is free from the blocking artifacts. Another constraint is the quantization constraint, which is derived from the quantization of the transform coefficients. The data of the quantization specify the upper and lower bounds on the transform coefficients. Imposing the quantization constraint ensures that the reconstruction image is consistent with the compression data. These two constraints define two convex sets of images. The deblocking procedure takes the reconstruction image of a block transform coding system as an initial image and alternates projecting the image onto the two convex sets until the image reaches the intersection of the two sets. The resulted image satisfies both the bandlimited constraint and the quantization constraint. Therefore, it is free from the blocking artifacts and is consistent with the compression data.

However, the bandlimited constraint is rather ad hoc. As the price for deblocking, it causes artifacts of blurring and introduces distortions of image features and removes horizontal and vertical edges that actually present in the original image.

SUMMARY OF THE DISCLOSURE

In the present invention, a transform-quantization compression system is combined with a constrained evolution system which performs an optimal reconstruction of an image from its reduced information. In this reconstruction, the given image information is reduced and thus is not enough to uniquely determine an image. There are many images that are consistent with the given information. Any of these image is a feasible reconstruction. It is desirable to have a criterion to select the optimal reconstruction among the many feasible reconstruction. In the context of a transform-quantization coding, the optimal reconstruction is a nonlinear optimization with linear inequality constraints. The constrained evolution system is designed for such optimal reconstruction. The criterion for the evaluation of images is crucial to the results of the constrained evolution system. The most successful criterion used for image processing has been minimizing oscillation, which has been previously used for image noise removal and image enhancement, with the method of minimizing the total variation of the images.

Minimizing the total variation with constraints minimizes oscillations while maintaining the edges sharp. While this property is appreciated for image processing, it is particularly useful for eliminating the artifacts introduced by a transform-quantization coding system. Instead of truncating the high frequency coefficients, the compression system of the present invention allows the high frequency coefficients to vary within a range given by the quantization parameter. This freedom permits the constrained evolution system to lower the total variation of the reconstruction image and prevents the formation of artifacts. The constrained evolution system imposes a number of local constraints on the reconstruction. The existence of a solution as well as the numerical convergence of the constrained evolution procedure are not obvious. No mathematical theory to substantiate the experimentally confirmed facts has been proposed to date.

BRIEF DESCRIPTION OF THE DRAWINGS

FIG. 12 is a block diagram of a decompression processor for use in cooperation with the compression processor of FIG. 9.

FIG. 13 is a diagram illustrating the process of image size expansion by optimal prediction in accordance with another alternative embodiment of the invention.

FIG. 14 is a block diagram of a reconstruction processor employed in carrying out the process illustrated in FIG. 13.

DETAILED DESCRIPTION OF THE PREFERRED EMBODIMENTS

Optimal Decompression

Figures 1, 2:
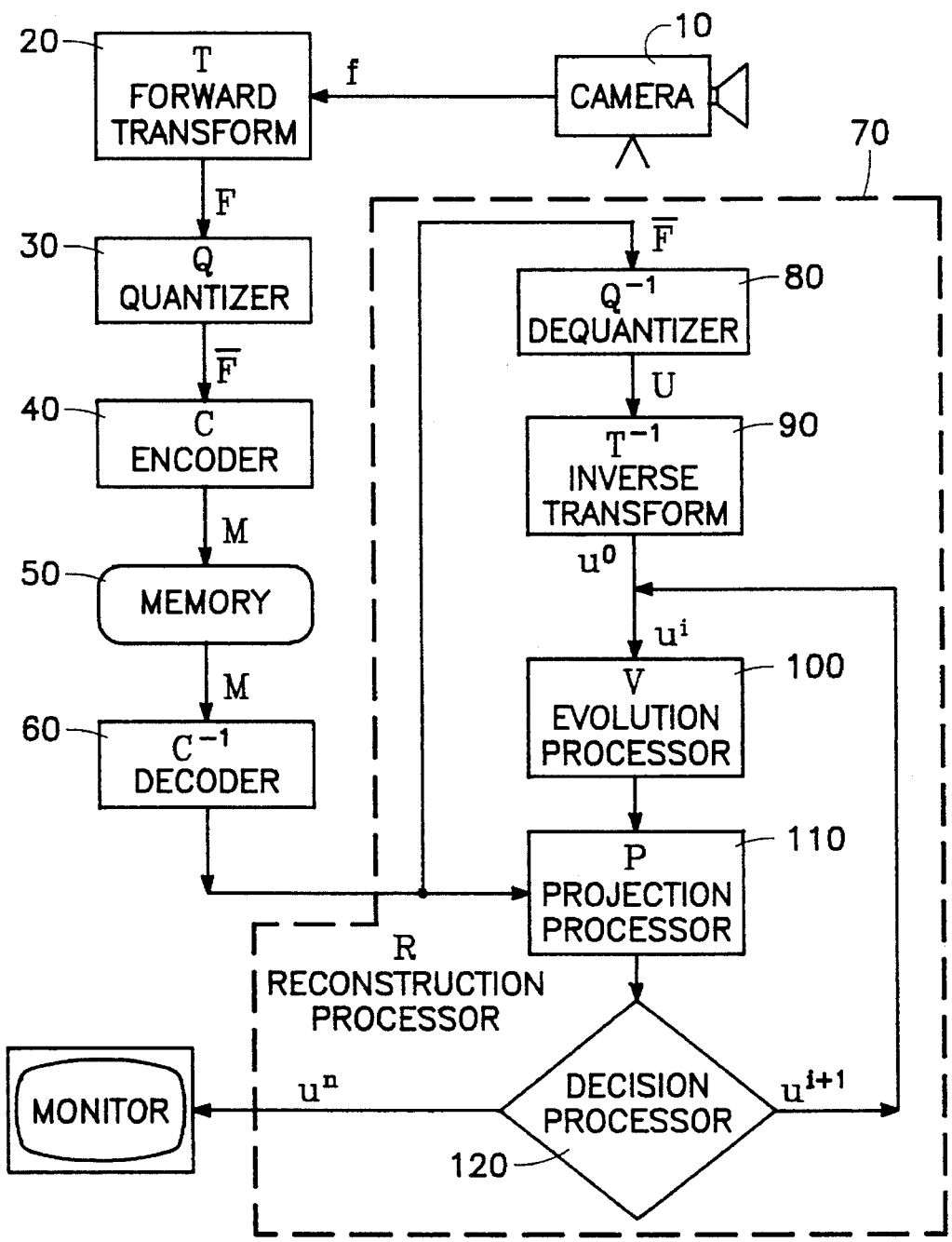
FIG. 1 is a block diagram of an image processing system in accordance with an embodiment of the invention.
FIG. 2 illustrates how quantization constraints are employed in the system of FIG. 1.

The upper portion of FIG. 1 illustrates one example of how a compressed image may be generated from a source image. A video camera 10 transmits a source image f consisting of a frame of picture elements or pixels organized in a predetermined number of rows and columns, the pixels having different pixel values corresponding to the appearance of the image. Using conventional techniques, the source image f is compressed by, first, a transform processor 20 which performs a transform T (such as a discrete cosine transform) to generate a transform coefficient domain "image" or transform F from the source image f. The transform F consists of coefficients usually corresponding to spatial frequencies. Next, a quantizing processor 30 quantizes each coefficient by assigning to it a bin index according to which quantizing bin the coefficient value happens to fall in, in accordance with a quantization process Q. This is best illustrated in FIG. 2 for the case of an exemplary quantizer, in which the eight lowest possible values of a coefficient are assigned a quantization value of 1, the next highest eight values are assigned a quantization value of 2, and so forth. This produces a quantized transform "image" $\bar{F}$. Then, a minimum redundancy encoder, such as a run-length encoder 40 encodes the quantized transform "image" $\bar{F}$ using an encoding process C to produce a compressed image M which is then stored in an image memory 50. In some cases, the memory 50 is replaced by a transmission channel. In order to recover a high-quality replica of the original source image f from the memory 50 (or from the receiving end of the transmission channel), the compressed image M is retrieved from the memory 50 and decoded by a minimum redundancy decoder 60 in accordance with a decoding process $C^{-1}$ to reproduce the quantized transform "image" $\bar{F}$. Thereafter, a reconstruction processor 70 embodying one aspect of the present invention reconstructs from $\bar{F}$ a very high-quality replica u of the original source image f. It does this by determining which dequantized inverse-transformed image u obtained from $\bar{F}$ satisfying the quantization constraints (FIG. 2) on $\bar{F}$ has minimum oscillation in the image, as will be described in detail below.

Reconstruction Processor 70

The reconstruction processor 70 includes a conventional dequantizing processor 80 which produces from $\bar{F}$ a dequantized transform image U by performing a conventional dequantization, mapping of index of each bin to the average value of the bin. The dequantization is a pseudo-inverse $Q^{-1}$ of the quantization process Q performed by the quantization processor 30. An inverse transform processor 90 performs the inverse $T^{-1}$ of the transform T performed by the transform processor 20 so as to produce from U a decompressed image u. An evolution processor 100 then modifies the decompressed image u so as to produce a version of u having less oscillation in the image. Then, a projection processor 110 modifies this latter version of u so that its transform U obeys the quantization constraints (FIG. 2) on $\bar{F}$. The resulting modified version of u is then fed back to the input of the evolution processor 100 for a further refinement of u. This cycle repeats itself in successive iterations in the loop around the evolution and projection processors 100, 110 illustrated in FIG. 1, until a decision processor 120 determines that a predetermined number (e.g., four) of such iterations have been performed. Alternatively, the decision processor 120 may halt the cycle upon determining that the modification by the evolution processor 100 and the projection processor 110 produced an average pixel magnitude change less than a predetermined value (e.g., $10^{-3}$). In either case, the result is that the decision processor 120 causes the projection processor 110 to transmit an optimally refined version of the decompressed image u. Successive versions of u produced in successive cycles are labelled $u^i$ in the drawing, where i denotes the number of the current cycle and runs from 0 to n.

Evolution Processor 100

Figure 3:
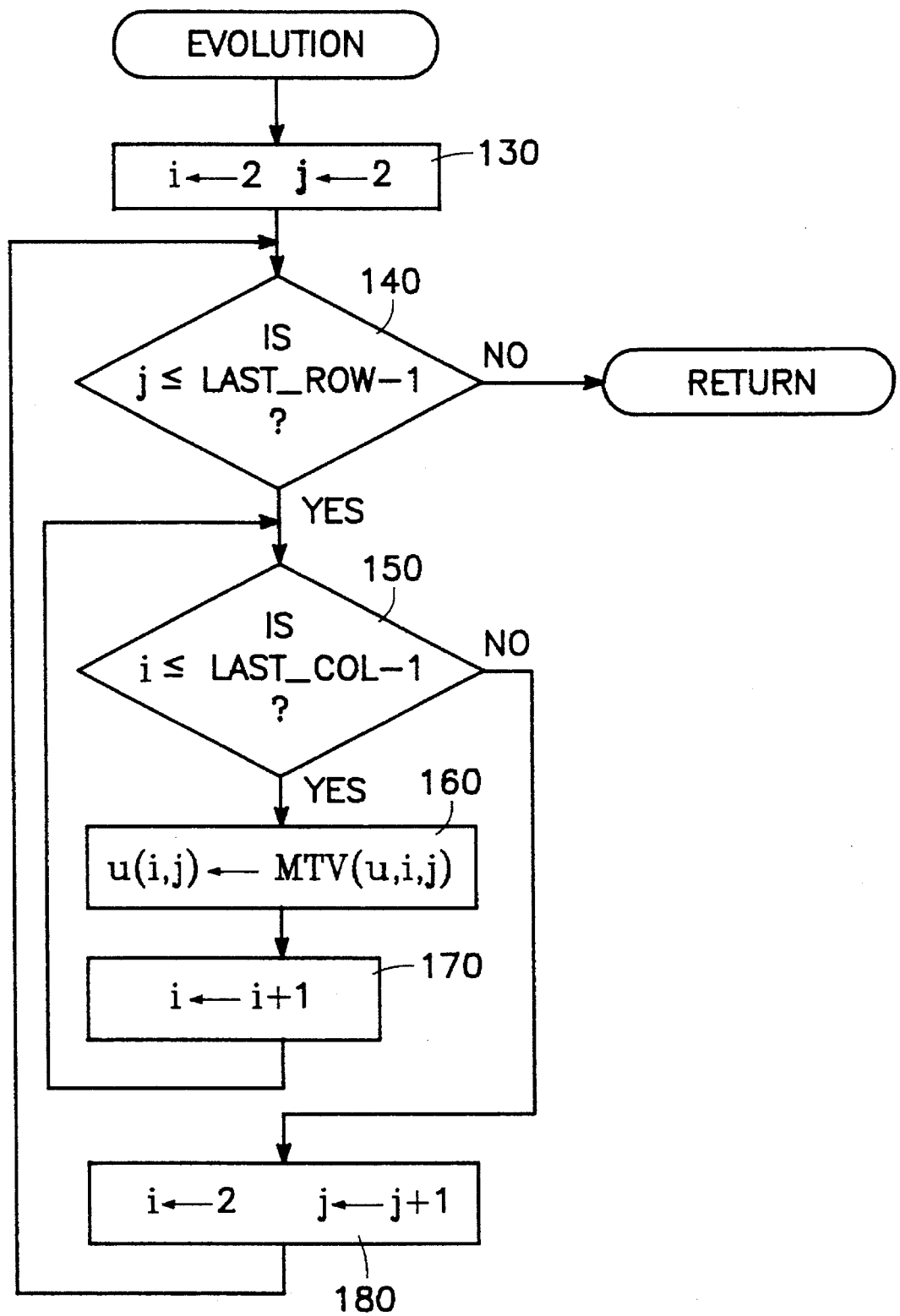
FIG. 3 is a flow diagram of an evolution process performed in the system of FIG. 1.

The function of the evolution processor 100 is illustrated in the flow diagram of FIG. 3. The process operates on the interior pixels of the image, from the second column from the left to the second column from the right and from the second row from the top to the second row from the bottom. The process begins by setting the column and row indices i and j to 2 (the second column from the left and the second row from the top) (block 130 of FIG. 3) and then begins each iteration of its internal cycle by making sure that the column and row indices have not exceeded the indices of the second column from the right and the second row from the bottom, respectively (blocks 140 and 150 of FIG. 3). Provided this latter condition is met, the evolution processor 100 makes an incremental modification to the pixel in the image u corresponding to the current row and column indices so as to reduce the oscillation in the local neighborhood of that pixel (block 160 of FIG. 3).

One form of the sub-process performed by the step of block 160 of FIG. 3, with emphasis on the reduction of oscillation of the value of image intensity, proceeds as follows. For a given pixel $u(i,j)$ in the $i^{th}$ column and the $j^{th}$ row of the image:

$U_xp0$, denoting $U_x$ at the position $(i+0.5,j)$, is the forward difference along the x (column-to-column) direction:

$$U_xp0:=u(i+1,j)-u(i,j);$$

$U_xm0$, denoting $U_x$ at the position $(i-0.5,j)$, is the backward difference along the x direction:

$$U_xm0:=u(i,j)-u(i-1,j);$$

$U_x0p$, denoting $U_x$ at the position $(i,j+0.5)$, is the average value of the central difference between the immediate neighboring pixels along the x direction at the current row and the next row:

$$U_x0p:=[u(i+1,j)-u(i-1,j)+u(i+1,j+1)-u(i-1,j+1)]/4;$$

$U_x0m$, denoting $U_x$ at the position $(i,j-0.5)$, is the average value of the central difference between the immediate neighboring pixels along the x direction at the current row and the previous row:

$$U_x0m:=[u(i+1,j)-u(i-1,j)+u(i+1,j-1)-u(i-1,j-1)]/4;$$

$U_yp0$ denoting $U_y$ at the position $(i+0.5,j)$ is the average value of the central difference between the immediate neighboring pixels along the y (row-to-row) direction at the current column and the next column:

$$U_yp0:=[u(i,j+1)-u(i,j-1)+u(i+1,j+1)-u(i+1,j-1)]/4;$$

$U_ym0$, denoting $U_y$ at the position $(i-0.5,j)$, is the average value of the central difference between the immediate neighboring pixels along the y direction at the current column and the previous column:

$$U_ym0:=[u(i,j+1)-u(i,j-1)+u(i-1,j+1)-u(i-1,j-1)]/4;$$

$U_y0p$, denoting $U_y$ at the position $(i,j+0.5)$, is the forward difference along the y direction:

$$U_y0p:=u(i,j+1)-u(i,j);$$

$U_y0m$, denoting $U_y$ at the position $(i,j-0.5)$, is the backward difference along the y direction:

$$U_y0m:=u(i,j)-u(i,j-1);$$

Gp0, Gm0, G0p and G0m, denoting the gradiant of U at $(i+0.5,j)$ $(i-0.5,j)$, $(i,j+0.5)$ and $(i,j-0.5)$, respectively, are each the square root of the sum of the square of $U_x$ and the square of $U_y$ at the corresponding position plus the square of a small number e (e.g., $10^{-3}$), the small number e being selected for numerical stability:

$$Gp0:=sqrt(U_xp0^2+U_yp0^2+e^2);$$
$$Gm0:=sqrt(U_xm0^2+U_ym0^2+e^2);$$
$$G0p:=sqrt(U_x0p^2+U_y0p^2+e^2);$$
$$G0m:=sqrt(U_x0m^2+U_y0m^2+e^2);$$

s, denoting the speed of the process, is the minimum of 0.25 and the quantity $1/[1/Gp0+1/Gm0+1/G0p+1/G0m]$:

$$s:=min(0.25,1/[1/Gp0+1/Gm0+1/G0p+1/G0m]).$$

With each iteration of the evolution processor 100, the current pixel $u(i,j)$ is modified:

$$u(i,j):=u(i,j)+s*[U_xp0/Gp0-U_xm0/Gm0+U_y0p/G0p-U_y0m/G0m];$$

Another form of the sub-process performed by the step of block 160, with emphasis on the reduction of oscillation of the geometry of image feature, proceeds as follows. For a given pixel $u(i,j)$ in the $i^{th}$ column and the $j_{th}$ row of the image,
$u_x$ is the central difference between the immediate neighboring pixels along the x (column-to-column) direction:

$$u_x:=[u(i+1,j)-u(i-1,j)]/2;$$

$u_y$ is the central difference between the immediate neighboring pixels along the y (row-to-row) direction:

$$u_y:=[u(i,j+1)-u(i,j-1)]/2;$$

$u_{xx}$ is the forward difference of the backward differences between the current pixel and its two immediate neighbors along the x direction:

$$u_{xx}:=u(i+1,j)-2u(i,j)+u(i-1,j);$$

$u_{yy}$ is the forward difference of the backward differences between the current pixel and its two immediate neighbors along the y direction:

$$u_{yy}:=u(i,j+1)-2u(i,j)+u(i,j-1);$$

$u_{xy}$ is the central difference of the central differences between the four nearest neighbor pixels surrounding the current pixel:

$$u_{xy}:=[u(i+1,j+1)-u(i+1,j-1)-u(i-1,j+1)+u(i-1,j-1)]/4.$$

With each iteration of the evolution processor 100, the current pixel $u(i,j)$ is modified by adding to it 0.25 * $[u_{xx}(u_y^2+e^2)-2u_{xy}u_xu_y+u_{yy}(u_x^2+e^2)]/[u_x^2+u_x^2+2e^2]$, where e is a small number (e.g., $10^{-3}$) selected for numerical stability.

This sub-process ultimately (upon its completion for all interior pixels in the image) reduces the oscillation in the image with minimal detraction from the information content or quality of the image. Thereafter, the column index is incremented (block 170 of FIG. 3) and the modification is performed for the next pixel after the check step of block 150 is performed. At the end of each column, the process proceeds to the next row (NO branch of block 150), the row index is incremented and the column index initialized (block 180) and the process reiterated from block 140 in repetitive cycles until all interior pixels have been processed by the sub-process of block 160 of FIG. 3.

Figure 4:
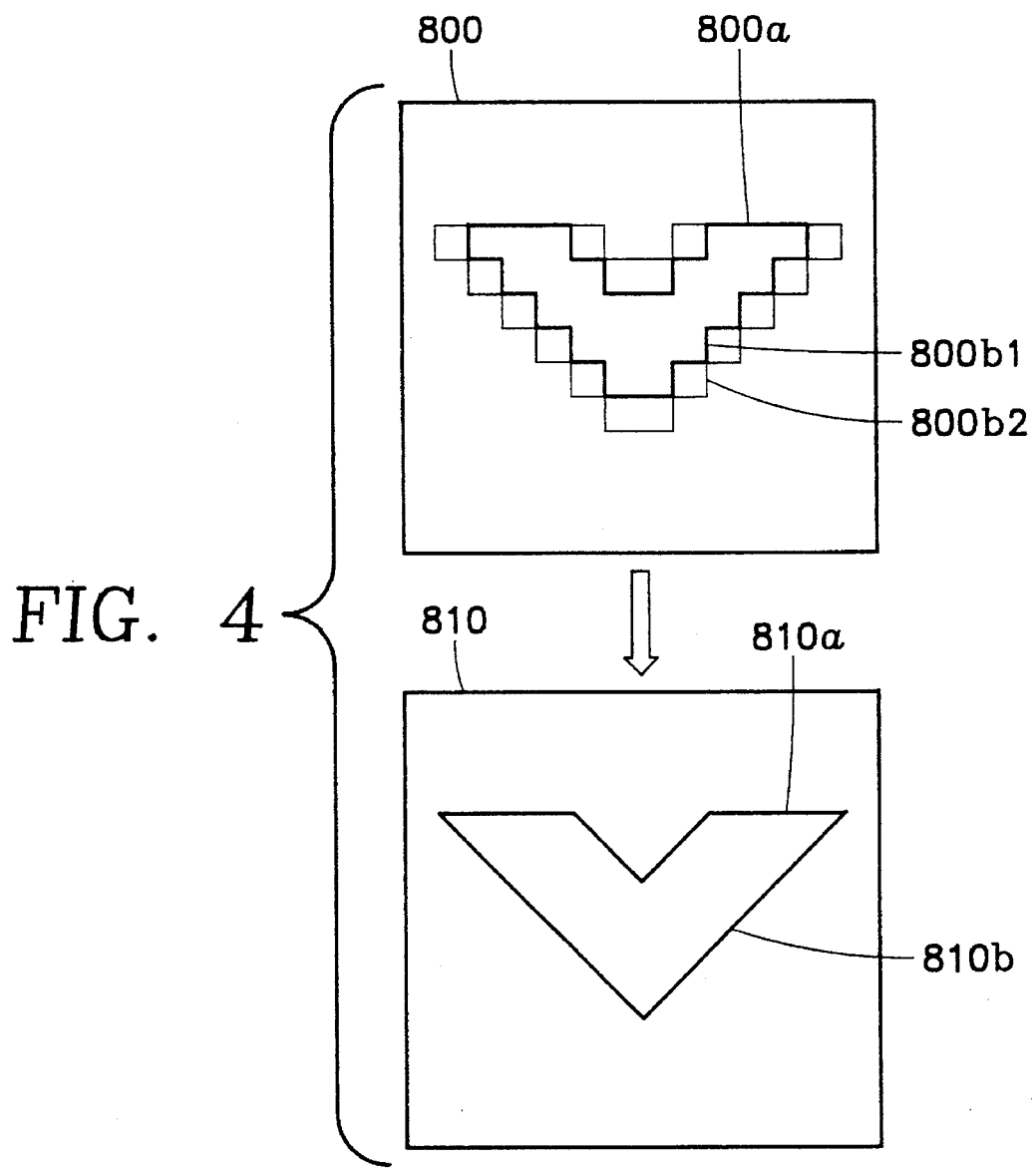
FIG. 4 illustrate the effects of the evolution process of FIG. 3.

The effects of this process are illustrated in FIG. 4. The reduction in geometric oscillation achieved by the second scheme of the sub-process of block 160 is achieved by changing the level set borders in the image. Connected image pixels having the same intensity amplitude are referred to as level sets. These level sets have borders which form various curves. There are two types of level set borders in an image obtained from a conventional decompression, those present in the original image, and those introduced by compression. The level set borders from the true edges of the original image usually have smooth geometry; while those spuriously introduced or distorted by the quantization/dequantization process always have oscillatory geometry. Box 800 of FIG. 4 is a typical example of the reconstructed image of a conventional decompression. Border 800a shows the true edge; while borders 800b1 and 800b2 show the blocking effects introduced by the quantization/dequantization process. Borders 800b1 and 800b2 are characterized by their geometric oscillation with a period corresponding to the block size.

The second scheme of the sub-process of block 160 improves the image by reducing the length of each level set border in accordance with the geometric oscillation of that border. Border 800a, having little geometric oscillation, is virtually unaffected by the process. Borders 800b1 and 800b2, on the other hand, having large geometric oscillations, are dramatically changed by the process. The process shifts the position of each point of the border according to the orientation and curvature of the border at that point. As a result, the process smooths the geometry of the borders 800b1 and 800b2. It should be noted that the smoothing is applied to the geometry, not to the intensity value. While the geometry gets smoothed, the intensity profile of the border remains sharp. The process occurs along the border tangentially to the border and never crosses it. Therefore, the process never blurs any edge in the image, a significant advantage. Box 810 of FIG. 4 shows the image of box 800 after processing. Border 800a becomes border 810a, virtually unchanged. Borders 800b1 and 800b2 evolve and merge to border 810b, which has smooth geometry and sharp intensity profile.

Projection Processor 110

Figure 5:
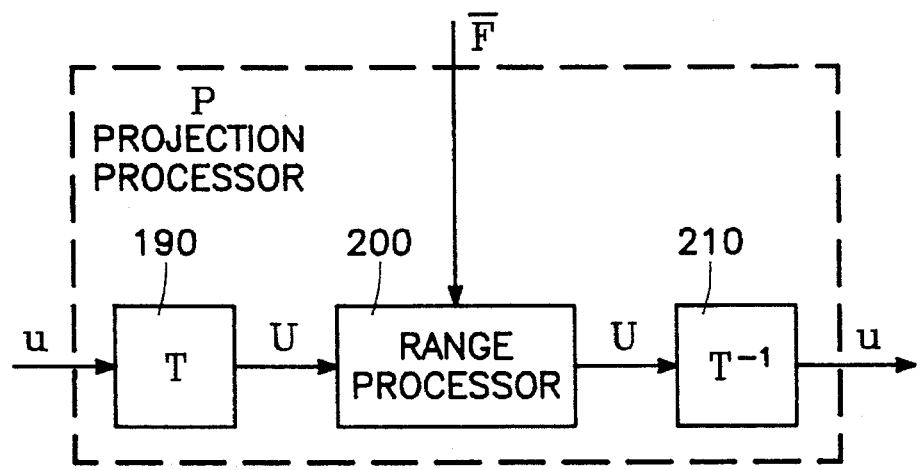
FIG. 5 is a block diagram of a projection processor in the system of FIG. 1.
Figure 6:
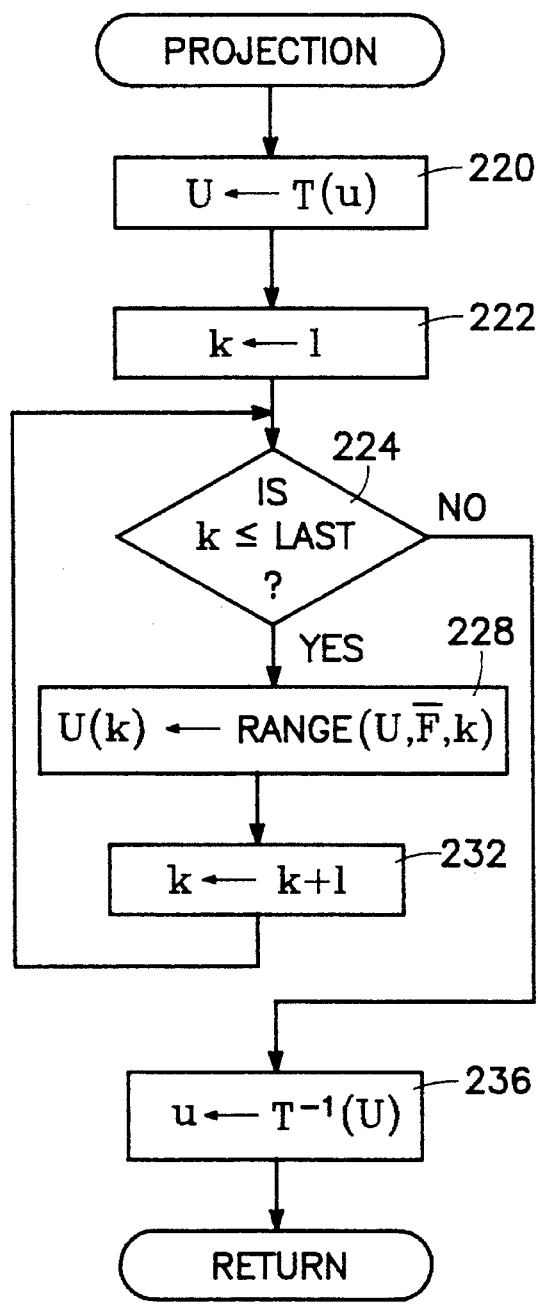
FIG. 6 is a flow diagram of a projection process carried out in the system of FIG. 1.

The projection processor 110 of FIG. 1 is illustrated in FIG. 5. It includes a transform processor 190 identical to the transform processor 20 of FIG. 1 which produces a transform U of the decompressed image u, a range processor 200 which modifies U so that each transform coefficient thereof conforms to the quantization bin indices or constraints of the corresponding coefficient of $\bar{F}$ (as will be described later herein), and an inverse transform processor 210 which back-transforms the transform image modified by the range processor 200 to an image u. Operation of the projection processor 110 is illustrated in FIG. 6. The forward transformation of u to U by the transform processor 190 (block 220 of FIG. 6) produces an array of transform coefficients. The array index k of the transform coefficients of U are initialized (block 222 of FIG. 6). Each iteration begins by verifying the index k has not exceeded the index of the last transform coefficient (blocks 224, of FIG. 6). Then, the current transform coefficient $U_k$ of U is compared with the corresponding component of $\bar{F}$, namely $\bar{F}_k$ by the range processor 200 and modified to fall within the quantization constraints of $\bar{F}_k$ (block 228 of FIG. 6). Then the index is iterated (block 232), and the process returned to the step of block 224 in repetitive cycles until the index of the last transform coefficient is exceeded. Upon completion (NO branch of block 224), the quantization-constrained minimized oscillation transform image U thus obtained is back-transformed by the inverse transform processor 210 to a quantization-constrained minimized oscillation image u (block 236 of FIG. 6).

Range Processor 200

Figure 7:
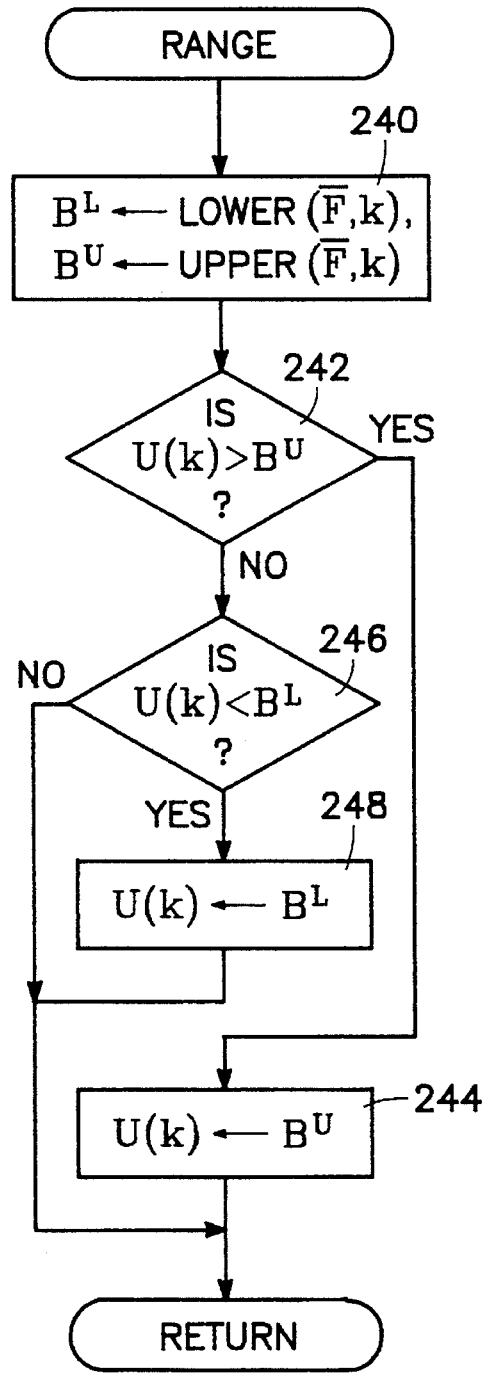
FIG. 7 is a flow diagram of a range process carried out in the system of FIG. 6.

FIG. 7 illustrates the operation of the range processor 200 of FIG. 1. The concept of the range processor 200 is best considered in light of the quantization illustrated in FIG. 2.

Each quantization bin has an upper and lower bound. For example, the upper bound of bin 1 is 8 and its lower bound is 1, while the upper bound of bin 2 is 16 and its lower bound is 9. For each current transform domain index k, the range processor 200 determines the upper and lower bounds $B^u$, $B^l$ of the quantization bin of the transform coefficient $\overline{F}_k$ (block 240 of FIG. 7). If the spatial frequency domain coefficient $U_k$ is greater than the upper bound $B^u$ of $\overline{F}_k$ (block 242 of FIG. 7), then the value of $U_k$ is changed to equal $B^u$ (block 244). On the other hand, if $U_k$ is less than the lower bound $B^l$ (block 246), then the value of $U_k$ is set equal to $B^l$ (block 248). Otherwise, $U_k$ lies within the quantization bin of $\overline{F}_k$ and is not modified by the range processor 200. In the latter case, the value of $U_k$, particularly where it does not fall in the center of the bin, is useful information characterizing the image.

Optimal Decompression for PCM Compressed Data

The foregoing apparatus and process may be applied to PCM (pulse code modulation) compressed data by treating each transformation process T and $T^{-1}$ as an identity operator.

Optimal Decompression with Progressive Mode

Figure 8:
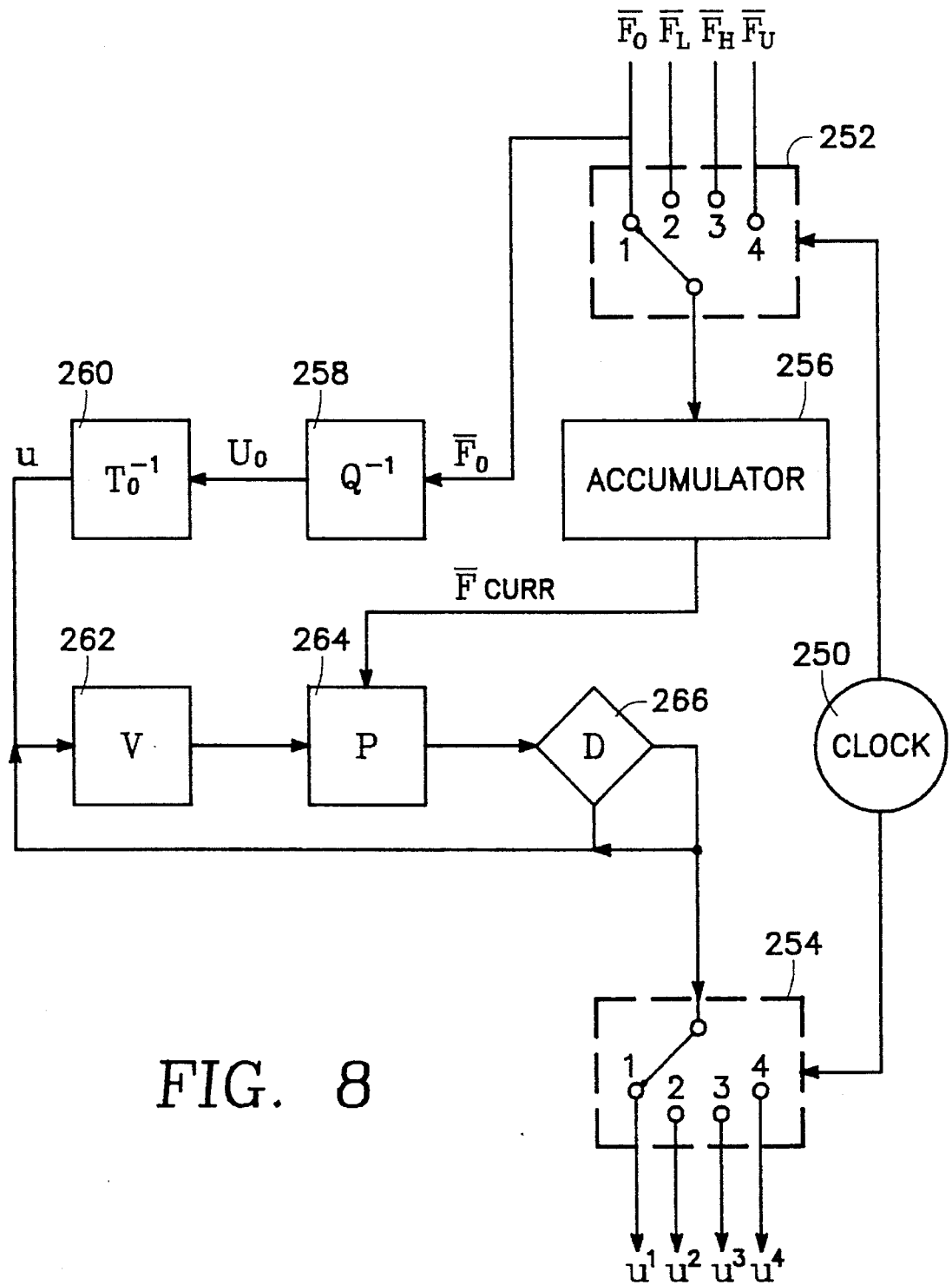
FIG. 8 illustrates one variation of a portion of the system of FIG. 1 in accordance with another embodiment of the invention.

The foregoing decompression apparatus and process can be implemented in a progressive mode by partitioning the compressed data into disjoined frequency regimes or groups of transform coefficients, and beginning the reconstruction process immediately after receiving the first part of transform, which usually comprises only the lowest frequency (D.C.) coefficient, Low frequency version of the reconstructed image are continuously output while higher frequency parts of the transform are being received. These higher frequency parts are used to refine the reconstructed image. Referring to FIG. 8, the compressed data (quantized transform) $\overline{F}$ is partitioned by an increasing frequency order into four groups: $\overline{F}_0$, $\overline{F}_L$, $\overline{F}_H$, and $\overline{F}_U$, which are input to the decompression system. Initially, only $\overline{F}_0$ is available to the system. A clock controller 250 controls and synchronizes an input selector 252 and an output selector 254. The decompression process begins by initializing the clock controller 250 to time 1, causing the input selector 252 and output selector 254 to select input line 1 and output line 1, respectively. As a result, the first part of quantized transform $\overline{F}_0$ is input to an accumulator 256, which accumulates the input quantized transform coefficients and produces the current available quantized transform coefficients $\overline{F}_{CURR}$. Thus at time 1, $\overline{F}_{CURR}$ is initialized to $\overline{F}_0$. Meanwhile, a dequantizer 258 identical to the dequantizer 80 of FIG. 1 takes $\overline{F}_0$ and produces a corresponding group of transform coefficients $U_0$. A modified inverse transform processor 260 corresponding to the inverse transform processor 90 of FIG. 1 takes $U_0$ and produces an initial reconstructed image u. The modified inverse transform processor 260 takes only a portion of the transform, namely the 0-group of the transform, instead of the entire transform. Its process is equivalent to first obtaining the 0-group transform coefficients from $U_0$ and setting all other transform coefficients to zero and then performing the normal inverse transform process in the same manner as the inverse transform processor 90. The initial reconstructed image u enters a refinement loop which consists of an evolution processor 262 identical to the evolution processor of 100 of FIG. 1, a modified projection processor 264 corresponding to the projection processor 110 of FIG. 1, and a decision processor 266 identical to the decision processor 120 of FIG. 1. The modified projection processor 264 is the same as the projection processor 110 of FIG. 1 except that it processes only the part of the transform corresponding to the current available part of compressed data, namely $\overline{F}_{CURR}$, instead of the entire transform. Referring to FIG. 5, the modification needed for the modified projection processor 264 is in the block 224, where the parameter LAST should be the index of the last transform coefficient in $\overline{F}_{CURR}$, instead of the last transform coefficient in the entire transform. At the end of time 1, the reconstructed image u is fed back for refinement for the next time step as well as going through the output selector 254 to be the first output version of the reconstructed image $u^1$. As the clock advances to next time step, the input selector 252 and the output selector 254 select the next input line and the next output line respectively. The next part of quantized transform is input to the accumulator 256, which adds it to $\overline{F}_{CURR}$, providing more constraints to the projection processor 264 for the reconstructed image refinement. The refined image from the previous time step is fed back for further refinement with more constraints provided by the additional compressed data available. With each time step, the reconstructed image u is refined by increasingly refined information. This decompression process progressively refines the reconstructed image during transmission.

Optimal Decompression with Vector Quantization

The received compressed image $\overline{F}$ may have been generated using vector quantization, a well-known technique. Essentially, vector quantization is employed whenever the image pixels in f, or, alternatively, the transform coefficients in F, are vectors. The vector space is divided into a number N of quantization bins less than the dimensionality of the vector space. The vectors in each bin are converted by the quantizer processor 30 to a particular vector or codeword, corresponding to a bin index. In this case, the quantizer 30 is a vector quantizer and each transform coefficient of $\overline{F}$ is a vector or codeword specified by the quantizer 30. The range processor 200 in this case functions so as to change a vector $U_k$ in U not lying in the correct bin of $\overline{F}$ to be that vector in the bin which is closest to $U_k$. Otherwise, the invention operates in the manner described above to decompress vector quantization images.

Optimal Predictive Compression

The features of the invention used in decompression as described above may be employed in an apparatus which performs optimal predictive compression in accordance with another aspect of the invention. Although a compression algorithm employing any suitable transform (such as a DCT, a wavelet transform and so forth) may be employed in carrying out this aspect of the invention, the following description is made with reference to a compression process employing a discrete cosine transform, a quantizer of the type relating to FIG. 2 and a minimum redundancy encoder of the type referred to with reference to FIG. 1. In the following description, the presence of such a minimum redundancy encoder is understood but not illustrated or described, as its presence does not affect the discussion below.

Figure 9:
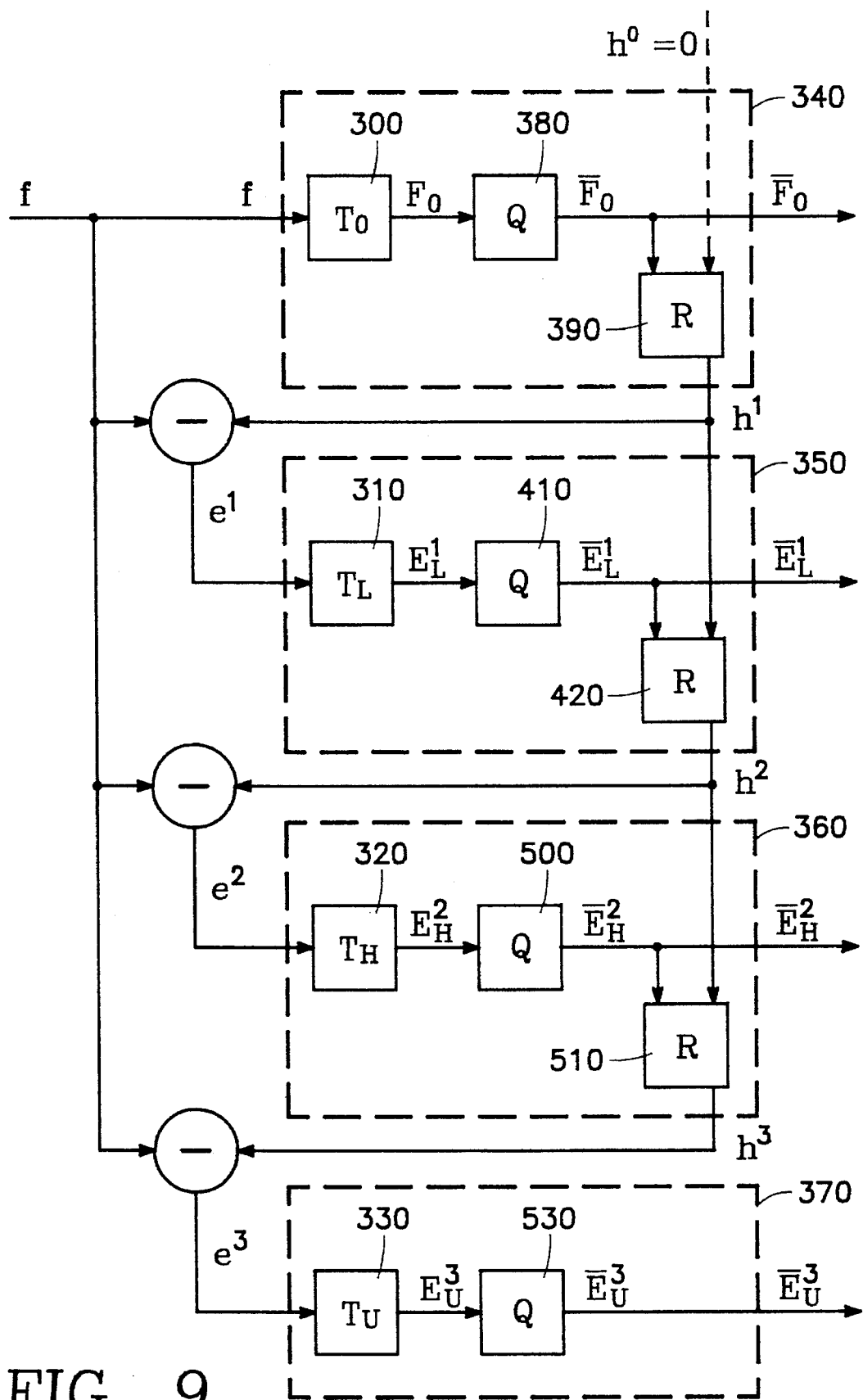
FIG. 9 is a block diagram of an optimal predictive compression processor in accordance with another embodiment of the invention.

FIG. 9 illustrates an optimal predictive compression processor embodying this aspect of the invention. A source image f is compressed in separate steps involving different frequency components of the transform T, which may be a discrete cosine transform as described above. Such a transform may be partitioned into separate transformation operators $T_0$, $T_1$, $T_2$, . . . and so forth corresponding to successively higher spatial frequency components. For example, $T_0$ is only that portion of the DCT transform operator T which computes the zero spatial frequency (DC) coefficient only. In the example of FIG. 9, the transform T is partitioned into four transforms, $T_0$, $T_L$, $T_H$, $T_U$, where the subscripts of T refer to those portions of T which compute the zero-frequency (D.C.) transform coefficient (0), a set of lower frequency coefficients (L), a set of higher frequency coefficients (H) and a set including the highest frequency coefficients (U). These correspond to four transform processors 300, 310, 320, 330, respectively in FIG. 9. The transform processors 300, 310, 320 and 330 reside in processor sections 340, 350, 360, 370, respectively which generate four corresponding frequency components of the compressed data. The forward transform processors 300–330 each perform a transform equivalent to first performing the normal forward transform and then taking as the results only those transform coefficients corresponding to the frequency range or components assigned to that processor.

In the first section 340, a quantizer processor 380 of the same type as the quantizer processor 30 of FIG. 1 quantizes the zero frequency (DC) transform image $F_0$ produced by the first transform processor 300, to produce a quantized transform image $\overline{F}_0$. A modified reconstruction processor 390 corresponding to but different from the reconstruction processor 70 of FIG. 1 computes a prediction image $h^1$ from $\overline{F}_0$. The modified reconstruction processor 390 is distinguished from the reconstruction processor 70 of FIG. 1 in that the constraints for the projection are taken from the corresponding part of the transform (i.e., the DC portion) only, instead of the entire transform. (The modified reconstruction processor 390 is equivalent to a modified reconstruction processor 420 described below herein with the initial prediction $h_0$ applied thereto set to zero.)

In the second processor section 350, a subtractor 400 computes a residual image $e^1$ by subtracting the prediction image $h^1$ from the source image f. The second transform processor 310 produces a transform residual $E^1_L$ from $e^1$. A quantizer processor 410 of the same type as the quantizer processor 380 produces a quantized transform residual $\overline{E}^1_L$. A modified reconstruction processor 420 produces from the quantized transform residual $\overline{E}^1_L$ and from the first prediction image $h^1$ a second (and more accurate) prediction image $h^2$.

Figure 10:
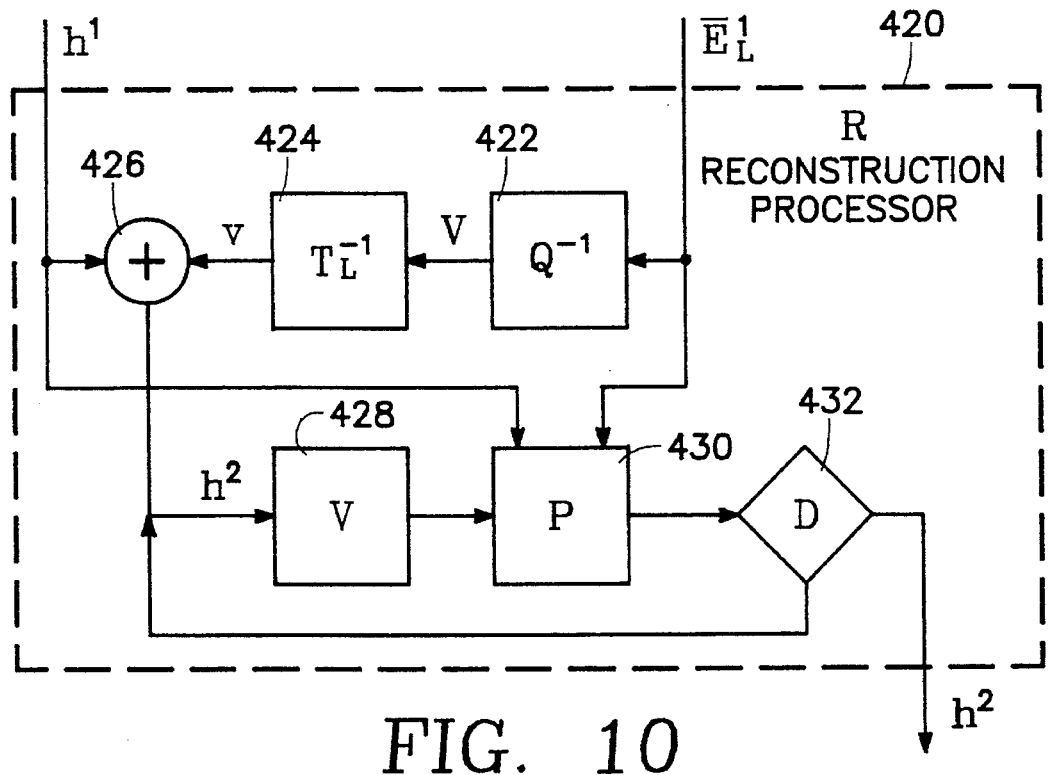
FIG. 10 is a block diagram of a modified reconstruction processor employed in the processor of FIG. 9.

FIG. 10 illustrates the modified reconstruction processor 420 of FIG. 9. Each processor section 340, 350, 360 has its own modified reconstruction processor 390, 420, 510, respectively, having the same architecture illustrated in FIG. 10. In FIG. 10, a dequantizer processor 422 and a modified inverse transform processor 424 corresponding respectively to the dequantizer and inverse transform processors 80, 90 of FIG. 1 produce a residual image v from the quantized transform residual $\overline{E}^1_L$. The modified inverse transform processor 424 in each of the processor sections 340, 350, 360 performs the inverse of the transform performed by the corresponding one of the modified forward transform processors 300, 310, 320, respectively. Thus, the modified inverse transform processor 424 is different from the inverse transform 90 in that the transform process of the modified inverse transform processor 424 is equivalent to first setting the transform coefficients, other than the coefficients obtained from the corresponding one of the modified forward transform processors 300–330, to zeros and then performing the normal inverse transform.

An adder 426 combines the first (previous) prediction image $h^1$ with the current residual image v to produce a second predicted image $h^2$. An evolution processor 428 identical to the evolution processor 100 of FIG. 1 reduces the oscillation in the second prediction image $h^2$. Then, a modified projection processor 430 corrects the second prediction image $h^2$ in accordance with the quantization constraints on $\overline{E}^1_L$.

Figure 11:
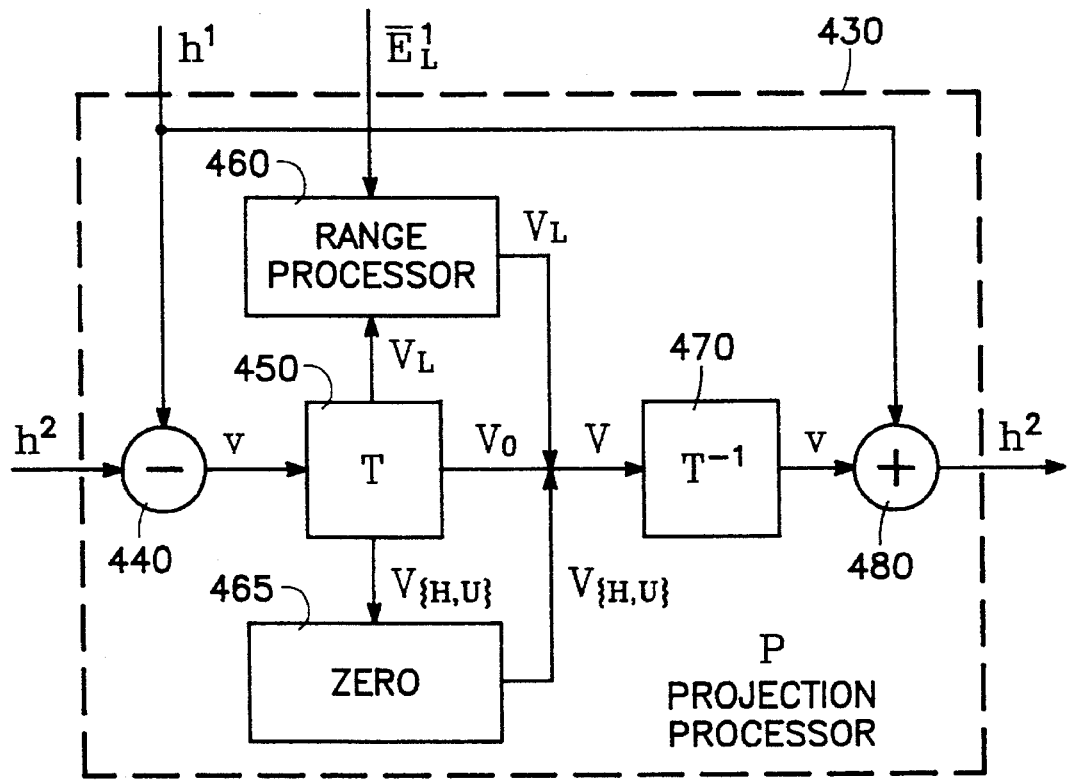
FIG. 11 is a block diagram of a modified projection processor in the reconstruction processor of FIG. 10.

FIG. 11 illustrates the modified projection processor 430 of FIG. 10. In FIG. 11, a subtractor 440 subtracts the prediction images $h^2$ and $h^1$ to provide the residual image v. A transform processor 450 identical to the processor 20 of FIG. 1 transforms the residual image v to a transform residual V, which is divided into three categories: (1) CURR, the group of transform coefficients corresponding to the current group of quantized transform residual, (2) PREV, the groups of transform coefficients corresponding to the previous groups of quantized transform residuals, (3) REST, the remaining groups of transform coefficients. In this example, the current group of quantized transform residual $\overline{E}^1_L$ is of group L. thus CURR is $V_L$, the L group of V, PREV is $V_0$, and REST is $V_H$ and $V_U$. The projection processor processes these three categories in the following ways: (1) CURR, A range processor 460 identical to the range processor 200 of FIG. 4 corrects $V_L$ in accordance with the quantization constraints of the transform residual $\overline{E}^1_L$; (2) PREV, A zero processor 465 sets every value of $V_0$ to zero; (3) REST, $V_H$ and $V_U$ are unchanged. The projected $V_0$, $V_L$, $V_H$ and $V_U$ are then combined to form a corrected version of V, which is back-transformed by an inverse transform processor 470 corresponding to the inverse transform processor 90 of FIG. 1 to produce an optimized version of the residual image v. This optimized version of v is combined with the first prediction image $h^1$ by an adder 480 to produce a refined version of the second prediction image $h^2$. It is this refined version of $h^2$ which is output for use in the next (third) processor section 360.

Referring again to FIG. 9, the third processor section 360 is identical to the previous section 350, except that the third transform processor 320 computes the high frequency transform coefficients. In the third section 360, a subtractor 490 computes a second residual image $e^2$ by subtracting the prediction image $h^2$ from the source image f. The third transform processor 320 produces a transform residual $E^2_H$ from $e^2$. A quantizer processor 500 of the same type as the quantizer processor 380 produces a quantized transform residual $\overline{E}^2_H$. A modified reconstruction processor 510 (identical to the modified reconstruction processor 420) produces from the quantized transform residual $\overline{E}^2_H$ and from the second prediction image $h^2$ a third and even more refined prediction image $h^3$.

In the fourth section 370, a subtractor 520 computes a third residual image $e^3$ by subtracting the third prediction image $h^3$ from the source image f. The fourth transform processor 330 produces a transform residual $E^3_U$ from $e^3$. A quantizer processor 530 of the same type as the quantizer processor 380 produces a quantized transform error $\overline{E}^3_U$.

The four quantized transforms $\overline{F}_0$, $\overline{E}^1_L$, $\overline{E}^2_H$ and $\overline{E}^3_U$ are transmitted as the compressed image data representing the source image f. The advantage is that this process produces much smaller residuals which can be encoded in fewer bits. The quantized D.C. transform coefficient $\overline{F}_0$ is of significantly greater magnitude than the transform residuals $\overline{E}^1_L$, $\overline{E}^2_H$ and $\overline{E}^3_U$ and contains most of the information required for production of a replica u of the source image f. The magnitudes of the successive refinements represented by $\overline{E}^1_L$, $\overline{E}^2_H$ and $\overline{E}^3_U$ fall off significantly, and therefore require less data to represent them. Where conventional thresholding and minimum redundancy encoding are used, the higher order refinements may be zero over many frames, thereby greatly increasing data compression.

While the example given here contemplates four quantized transforms, this embodiment of the invention can be modified to increase or decrease the number of quantized transforms representing the source image f.

Optimal Predictive Decompression

The compressed data generated by the apparatus of FIG. 9 is decompressed by the apparatus of FIG. 12. The decompressor of FIG. 12 consists of the reconstruction processor 390 of FIG. 9 and three modified reconstruction processors 420a through 420c each identical to the modified reconstruction processor 420 of FIG. 9, which accepts a predictive image $h^i$ from the previous reconstruction processor. In FIG. 12, the first quantized transform $\bar{F}_Z$ is fed to the input of the first reconstruction processor 390 to generate a first predictive image $h^1$, which is applied as the preceding predictive image to the next reconstruction processor 420a. The second quantized transform $\bar{E}^1_L$ is applied to the input of the second reconstruction processor 420a to produce a second predictive image $h^2$, which is applied as a preceding predictive image to the next reconstruction processor 420b. The third quantized transform $\bar{E}^2_H$ is applied to the input of the third reconstruction processor 420b to produce a third predictive image $h^3$, which is applied as a preceding predictive image to the next reconstruction processor 420c. The fourth quantized transform $\bar{E}^3_U$ is applied to the input of the fourth reconstruction processor 420c to produce a decompressed image u which is a high quality replica of the source image f.

Image Size Expansion by Optimal Prediction

The optimal prediction feature of the present invention is employed in one embodiment to expand an image to a large number of pixels (e.g., 16 times as many pixels). Referring to FIG. 13, the value of each pixel in the initial smaller image $u_0$ is assigned to the zero frequency or D.C. transform coefficient of a corresponding 4-by-4 block of transform coefficients in which the remaining coefficients are of zero magnitude, all of the 4-by-4 blocks constituting a spatial frequency transform $F_0$. A reconstruction processor illustrated in FIG. 14 of the type described above is employed to generate the expanded image from $F_0$. In FIG. 14, a dequantization processor 600 dequantizes each coefficient in $F_0$ and an inverse transform processor 610 transforms all 4-by-4 blocks of dequantized transform coefficients to produce a spatial domain image u. An evolution processor 620 of the type described above reduces the total variation in u and then a projection processor 630 of the type described above refines u in accordance with the quantization constraints on each corresponding transform coefficient in $F_0$ to produce a refined version of u. The refined version of u is fed back to the input of the evolution processor 620 in a repetitive cycle that is terminated by a decision processor 640 upon a predetermined number of iterations being completed or upon average change across the image induced by the evolution processor 620 in a given iteration of the cycle falling below a predetermined value. At this point, the latest version of u is output as the optimum expanded image.

While the invention has been described in detail by reference to preferred embodiments thereof, it is understood that variations and modifications may be made without departing from the true spirit and scope of the invention.

Appendix A (pages A-1 through A-37) of this specification contains a listing of a C-language program for carrying out the invention. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method of producing a video image from a compressed version of a source video image which has been compressed by transforming to a transform domain and quantizing said source video image in accordance with quantization constraints, comprising:

inverse transforming from said transform domain and dequantizing said compressed version to produce a first decompressed video image;

reducing total variation in said first decompressed video image by reducing lengths of level pixel sets in the image as a function of spatial oscillation of each level set to produce a reduced variation image;

transforming said reduced variation image to produce a revised transform and conforming said revised transform with said quantization constraints of said compressed version so as to produce a constrained transform; and inverse transforming said constrained transform so as to produce a replica of said source video image.

2. The method of claim 1 wherein said quantization constraints correspond to upper and lower bounds of respective quantization bins into which respective components of said compressed version fit.

3. The method of claim 2 wherein the step of conforming said revised transform comprises changing values of respective components of said revised transform toward upper or lower bounds of corresponding quantization bins depending upon whether said components of said revised transform are above or below said upper or lower bounds, respectively, of the corresponding quantization bins.

4. The method of claim 1 wherein the step of reducing total variation comprises spatially shifting level pixel sets in the image as a function of spatial oscillations of each level set.

5. The method of claim 1 wherein the step of reducing lengths is performed tangentially with respect to edges in said image associated with each level set.

6. A method of compressing a source video image, comprising:

defining plural sub-transform operators corresponding to respective portions of a transform domain;

initializing an initial prediction image;

performing plural iterations corresponding to said plural sub-transform operators, each iteration comprising the following steps:

(a) subtracting the prediction image of the previous iteration from said source video image to produce a residual image;

(b) transforming said residual image with the sub-transform operator corresponding to the current iteration;

(c) quantizing the result of step (b) by associating it with quantization constraints to produce a quantized transform residual and outputting said quantized transform residual;

(d) dequantizing and inverse transforming said quantized transform residual;

(e) adding the result of step (d) to the prediction image of the previous iteration to produce a current prediction image;

(f) reducing total variation in said current prediction image by reducing lengths of level pixel sets in the image as a function of spatial oscillation of each level set to produce a reduced variation current prediction image;

(g) subtracting the prediction image of the previous iteration from said reduced variation current prediction image to produce a revised current residual image;

(h) transforming said revised current residual image to produce a current residual transform and conforming said current residual transform with said quantization constraints of said transform residual of step (c) to produce a modified transform residual;

(i) inverse transforming said modified transform residual to produce a modified residual image and adding said modified residual image to the prediction image of the previous iteration to produce the prediction image of the current iteration.

7. The method of claim 6 wherein said quantization constraints correspond to upper and lower bounds of respective quantization bins into which respective components of said compressed version fit.

8. The method of claim 7 wherein the step of conforming said residual transform comprises changing values of respective components of said revised transform toward upper or lower bounds of corresponding quantization bins depending upon whether said components of said revised transform are above or below said upper or lower bounds, respectively, of the corresponding quantization bins.

9. The method of claim 6 wherein the step of initializing an initial prediction image comprising setting it to zero.

10. The method of claim 6 wherein the initial one of said sub-transform operators corresponds to a zero-frequency component.

11. The method of claim 6 wherein the step of reducing total variation comprises spatially shifting level pixel sets in the image as a function of spatial oscillations of each level set.

12. The method of claim 6 wherein the step of reducing lengths is performed tangentially with respect to edges in said image associated with each level set.

13. A method of decompressing an image which has been compressed into successive quantized transform residuals satisfying respective quantization constraints, comprising:

initializing an initial prediction image;

performing an iteration of the following steps for each of said successive quantized transform residuals:

(a) dequantizing and inverse transforming the quantized transform residual corresponding to the current iteration;

(b) adding the result of step (a) to the prediction image of the previous iteration to produce a current prediction image;

(c) reducing total variation in said current prediction image by reducing lengths of level pixel sets in the image as a function of spatial oscillation of each level set to produce a reduced variation current prediction image;

(d) subtracting the prediction image of the previous iteration from said reduced variation current prediction image to produce a revised current residual image;

(e) transforming said revised current residual image to produce a current residual transform and conforming said current residual transform with said quantization constraints to produce a modified transform residual;

(f) inverse transforming said modified transform residual to produce a modified residual image;

combining the modified residual images of all iterations to produce a decompressed image.

14. The method of claim 13 wherein said quantization constraints correspond to upper and lower bounds of respective quantization bins into which respective components of said quantized transform residuals fit.

15. The method of claim 14 wherein the step of conforming said current residual transform comprises changing values of respective components of said current transform toward upper or lower bounds of corresponding quantization bins depending upon whether said components of said current residual transform are above or below said upper or lower bounds, respectively, of the corresponding quantization bins.

16. The method of claim 13 wherein the step of reducing total variation comprises spatially shifting level pixel sets in the image as a function of spatial oscillations of each level set.

17. The method of claim 13 wherein the step of reducing lengths is performed tangentially with respect to edges in said image associated with each level set.

18. A method of recovering a video image from a compressed version of a source video image which has been compressed by quantizing said source video image so as to impose quantization constraints thereon, comprising:

dequantizing said compressed version to produce a first decompressed video image;

reducing total variation in said first decompressed video image by reducing lengths of level pixel sets in the image as a function of spatial oscillation of each level set to produce a reduced variation image;

conforming said reduced variation image with said quantization constraints of said compressed version so as to produce a replica of said source video image.

19. The method of claim 18 wherein the step of reducing total variation comprises spatially shifting level pixel sets in the image as a function of spatial oscillations of each level set.

20. The method of claim 18 wherein the step of reducing lengths is performed tangentially with respect to edges in said image associated with each level set.

21. A method of compressing a source video image, comprising:

defining plural sub-transform operators corresponding to respective portions of a transform domain;

initializing a prediction image;

performing plural iterations corresponding to said plural sub-transform operators, each iteration comprising the following steps:

(a) generating and outputting a quantized transform corresponding to the sub-transform operator of the current iteration of a residue of the source image and previous iteration's prediction image falling within certain quantization constraints;

(b) generating an inverse transformed de-quantized residue from the result of step (a), adding it to the prediction image of the previous iteration and producing from the sum thereof a reduced-variation image, wherein lengths of level pixel sets in the image are reduced as a function of spatial oscillation of each level set;

(c) subtracting the previous iteration's prediction image from said reduced-variation image to generate a revised residue;

(d) conforming the transform of the revised residue with said quantization constraints and adding the inverse transform of the result thereof to the prediction image of the previous iteration to produce the prediction image of the current iteration.

22. The method of claim 17 wherein the step of reducing total variation comprises spatially shifting level pixel sets in the image as a function of spatial oscillations of each level set.

23. A method of expanding an image of n pixels to an image of m*n pixels from a compressed version of the image which has been compressed by transforming to a transform domain and quantizing said image in accordance with quantization constraints, comprising:

defining n blocks of m spatial frequency transform coefficients;

defining each zero frequency coefficient in each of said blocks as being the value of the corresponding pixel in said n pixel image;

dequantizing the coefficients in each block and inverse transforming each block to produce a trial image;

reducing total variation in said trial image by reducing lengths of level pixel sets in the image as a function of spatial oscillation of each level set to produce a reduced variation image;

transforming said reduced variation image to produce a revised transform and conforming said revised transform with quantization constraints of the dequantizing step so as to produce a constrained transform; and inverse transforming said constrained transform so as to produce said expanded image.

24. The method of claim 23 wherein the step of reducing total variation comprises spatially shifting level pixel sets in the image as a function of spatial oscillations of each level set.

* * * * *